No. 885,395. PATENTED APR. 21, 1908.
A. STRUBLE.
CORN GRADER.
APPLICATION FILED APR. 15, 1907.

WITNESSES:

Alfred Struble,
INVENTOR.

By
ATTORNEYS

UNITED STATES PATENT OFFICE.

ALFRED STRUBLE, OF CARTHAGE, ILLINOIS.

CORN-GRADER.

No. 885,395.  Specification of Letters Patent.  Patented April 21, 1908.

Application filed April 15, 1907. Serial No. 368,287.

*To all whom it may concern:*

Be it known that I, ALFRED STRUBLE, a citizen of the United States, residing at Carthage, in the county of Hancock and State of Illinois, have invented a new and useful Corn-Grader, of which the following is a specification.

This invention has relation to corn graders or riddles and it consists in the novel construction and arrangement of its parts as hereinafter shown and described.

The object of the invention is to provide a means for separating grains of corn of regular shape from the irregular grains. The regular kernels thus separated being preferable for seeding purposes.

The grader consists of a metallic sheet having openings extending transversely with relation to the same and being elongated so as to permit long and narrow grains to pass therethrough edgewise while the round and irregular grains will roll over the perforations and fall from the end of the sheet. Means is provided for jarring or moving the sheet in order to keep the grains in a state of agitation and the sheet is inclined at a suitable angle. The said openings are arranged in rows which extend longitudinally of the sheet and the metal between the adjacent openings of the rows is concaved in order that the long and narrow grains may rest therein upon their edges and consequently will be more apt to turn and pass through the openings as the sheet is jarred. The said concaved portions are slightly longer than the said openings.

Figure 1:
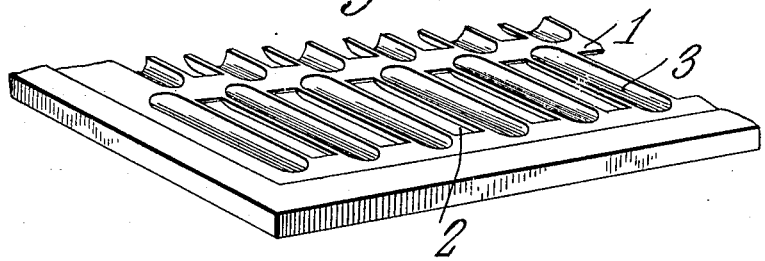
Figure 2:
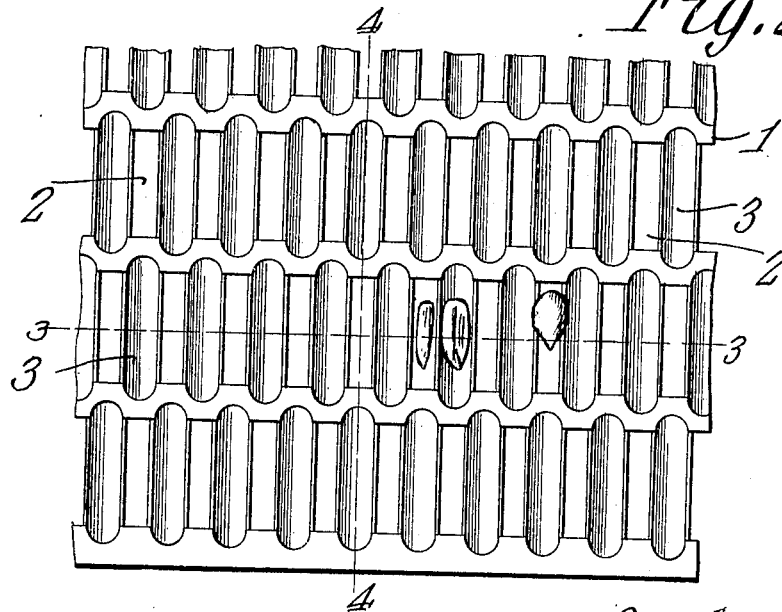
Figure 3:
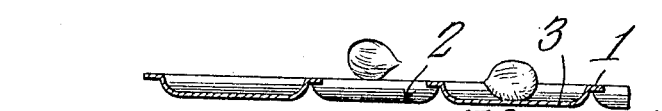
Figure 4:

In the accompanying drawing:—Figure 1 is a perspective view of a portion of the riddle. Fig. 2 is a top plan view of a portion of the same. Fig. 3 is a sectional view cut on the line 3—3 of Fig. 2, and Fig. 4 is a sectional view cut on the line 4—4 of Fig. 2.

The grader consists of the sheet 1 which is inclined and means is provided for jarring or moving the said sheet in order to keep the grain which is deposited thereon in a state of agitation. The said sheet is provided with the elongated openings 2, the longer axes of which are disposed transversely of the sheet. The said openings are arranged in rows which extend longitudinally of the sheet. The metal of the sheet lying between the adjacent openings of the rows is concaved as at 3 and said concavities are slightly longer than the said openings.

In operation the sheet is kept in a state of motion manually or by power and the grain is deposited upon the elevated end portion thereof. As the grain runs down along the sheet the round or irregular shaped kernels will run over the openings 2 and fall from the lower end of the sheet while long and narrow grains will lodge upon their edges in the concavities 3 and as they jostle out of the said concavities they turn axially and pass down through the next lower adjacent openings 2. Thus the long and narrow grains which are preferred for seeding purposes pass through the riddle and the other grain passes from the end of the riddle and the different kinds of grain are separated.

Having described my invention what I claim as new and desire to secure by Letters-Patent is:—

1. A grader comprising a metallic sheet having a plurality of rows of elongated openings and elongated concavities parallel with the openings, the edges of which form the edges of the openings.

2. A grader comprising a metallic sheet having a plurality of rows of elongated openings and elongated concavities parallel with the openings, the successive rows being arranged in staggered order with relation to each other.

In testimony that I claim the foregoing as my own, I have hereto affixed my signature in the presence of two witnesses.

ALFRED STRUBLE.

Witnesses:
S. A. SYMPSON,
WM. BECKELLYMER.